(12) United States Patent
Rajan et al.

(10) Patent No.: US 9,143,737 B2
(45) Date of Patent: Sep. 22, 2015

(54) DATA DISTRIBUTION

(75) Inventors: Padmakumar Rajan, Chennai (IN);
Armando Stettner, Westford, MA (US);
Michael Ruffini, Methuen, MA (US);
Harpal Bassali, Kirkland, WA (US);
Dongchen Wang, Concord, MA (US);
Arjun Baskaran, Chennai (IN);
Mariappan Chellam, Chennai (IN);
Akhil Malhotra, Bangalore (IN);
Harshi Agrawal, HiteC (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 224 days.

(21) Appl. No.: 13/252,383

(22) Filed: Oct. 4, 2011

(65) Prior Publication Data

US 2012/0023523 A1    Jan. 26, 2012

Related U.S. Application Data (63) Continuation-in-part of application No. 12/579,570, filed on Oct. 15, 2009.

(51) Int. Cl.
| | |
|---|---|
| *H04N 7/173* | (2011.01) |
| *G06F 3/00* | (2006.01) |
| *G06F 13/00* | (2006.01) |
| *H04N 5/445* | (2011.01) |
| *H04N 21/236* | (2011.01) |
| *H04N 21/434* | (2011.01) |
| *H04N 21/462* | (2011.01) |
| *H04N 21/4722* | (2011.01) |
| *H04N 21/6405* | (2011.01) |

(52) U.S. Cl.
CPC ..... *H04N 7/17318* (2013.01); *H04N 21/23617* (2013.01); *H04N 21/4349* (2013.01); *H04N 21/4622* (2013.01); *H04N 21/4722* (2013.01); *H04N 21/6405* (2013.01)

(58) Field of Classification Search
CPC ................... H04N 7/17318; H04N 21/23617; H04N 21/4349; H04N 21/4622; H04N 21/4722; H04N 21/6405
USPC ........................................... 725/39, 116, 131
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,335,079 A | 8/1994 | Yuen et al. |
| 5,353,121 A | 10/1994 | Young et al. |

(Continued)

*Primary Examiner* — Jonathan V Lewis (57) ABSTRACT

A device may include a communication interface configured to receive programming information and index data associated with the programming information from a service provider multicast over a plurality of channels. The device may also include logic configured to request address information from the service provider, receive the address information, wherein the address information includes a first multicast address, and join a first multicast group corresponding to the first multicast address, wherein the first multicast group is associated with the index data. The logic may also be configured to receive, via the communication interface, the index data, identify a second multicast address associated with at least some of the programming information, join a second multicast group corresponding to the second multicast address, and receive, via the communication interface, at least some of the programming information.

18 Claims, 10 Drawing Sheets

(56) References Cited

U.S. PATENT DOCUMENTS

| | | |
|---|---|---|
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,753 A | 9/1998 | Eyer et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,946,045 A | 8/1999 | Ozkan et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,281,940 B1 | 8/2001 | Sciammarella |
| 6,323,911 B1 | 11/2001 | Schein et al. |
| 6,337,715 B1 | 1/2002 | Inagaki et al. |
| 6,341,195 B1 | 1/2002 | Mankovitz et al. |
| 6,341,374 B2 | 1/2002 | Schein et al. |
| 6,349,115 B1 | 2/2002 | Tahara et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 * | 11/2002 | Yuen et al. ..................... 725/41 |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,651,252 B1 | 11/2003 | Gordon et al. |
| 6,658,661 B1 | 12/2003 | Arsenault et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,859,839 B1 | 2/2005 | Zahorjan et al. |
| 6,965,593 B2 * | 11/2005 | Donahue et al. ............... 370/352 |
| 7,039,935 B2 | 5/2006 | Knudson et al. |
| 7,069,576 B1 | 6/2006 | Knudson et al. |
| 7,487,529 B1 | 2/2009 | Orlick |
| 7,558,870 B2 * | 7/2009 | Parker .......................... 709/231 |
| 7,565,153 B2 | 7/2009 | Alcock et al. |
| 7,707,609 B2 * | 4/2010 | O'Donnell et al. ............. 725/61 |
| 7,788,691 B2 * | 8/2010 | Tsukamoto .................... 725/50 |
| 7,840,981 B2 * | 11/2010 | Atwater et al. ................ 725/51 |
| 7,849,487 B1 | 12/2010 | Vosseller |
| 7,864,767 B2 * | 1/2011 | Jang ............................. 370/390 |
| 7,873,972 B2 | 1/2011 | Zaslavsky et al. |
| 7,913,279 B2 | 3/2011 | Simms et al. |
| 8,032,917 B2 | 10/2011 | Poli et al. |
| 8,104,062 B2 * | 1/2012 | Terakado et al. .............. 725/50 |
| 8,245,257 B1 * | 8/2012 | Stettner ......................... 725/54 |
| 8,774,062 B2 * | 7/2014 | Bahnck et al. ................. 370/270 |
| 8,875,179 B2 * | 10/2014 | Savard et al. .................. 725/38 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0013949 A1 | 1/2002 | Hejna |
| 2002/0073424 A1 | 6/2002 | Ward, III et al. |
| 2002/0124255 A1 | 9/2002 | Reichardt et al. |
| 2003/0005445 A1 | 1/2003 | Schein et al. |
| 2003/0014752 A1 * | 1/2003 | Zaslavsky et al. ............. 725/40 |
| 2003/0037331 A1 | 2/2003 | Lee |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0177161 A1 * | 9/2004 | Hoang .......................... 709/246 |
| 2004/0194138 A1 | 9/2004 | Boylan et al. |
| 2004/0246984 A1 * | 12/2004 | Hundscheidt et al. ........ 370/432 |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0028206 A1 * | 2/2005 | Cameron et al. .............. 725/46 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |

(56) References Cited

U.S. PATENT DOCUMENTS

| | | |
|---|---|---|
| 2005/0216942 A1* | 9/2005 | Barton ............................ 725/97 |
| 2005/0232293 A1* | 10/2005 | Pelt et al. ...................... 370/432 |
| 2005/0251824 A1 | 11/2005 | Thomas et al. |
| 2006/0064721 A1* | 3/2006 | Del Val et al. .................. 725/41 |
| 2006/0156336 A1 | 7/2006 | Knudson et al. |
| 2006/0168632 A1 | 7/2006 | Honda et al. |
| 2006/0174276 A1* | 8/2006 | Derrenberger et al. ......... 725/46 |
| 2006/0212894 A1 | 9/2006 | Knudson et al. |
| 2006/0253867 A1* | 11/2006 | Potrebic et al. ................. 725/50 |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0061840 A1 | 3/2007 | Walter et al. |
| 2007/0107010 A1 | 5/2007 | Jolna et al. |
| 2007/0192812 A1* | 8/2007 | Pickens et al. .................. 725/94 |
| 2007/0266414 A1 | 11/2007 | Kahn et al. |
| 2008/0083000 A1* | 4/2008 | Orrell et al. ..................... 725/53 |
| 2008/0109857 A1* | 5/2008 | Goodwill et al. ............... 725/87 |
| 2008/0127259 A1* | 5/2008 | Hong et al. ...................... 725/39 |
| 2008/0155612 A1* | 6/2008 | Ikeda et al. ...................... 725/87 |
| 2008/0205396 A1* | 8/2008 | Dakshinamoorthy et al. ............................ 370/390 |
| 2008/0253564 A1 | 10/2008 | Kahn et al. |
| 2008/0271068 A1* | 10/2008 | Ou et al. ......................... 725/32 |
| 2009/0007189 A1* | 1/2009 | Gutknecht et al. .............. 725/64 |
| 2009/0044242 A1* | 2/2009 | Ramakrishnan et al. ...... 725/118 |
| 2009/0106792 A1* | 4/2009 | Kan et al. ........................ 725/34 |
| 2009/0144768 A1* | 6/2009 | Nagaraja ......................... 725/39 |
| 2009/0150926 A1* | 6/2009 | Schlack .......................... 725/34 |
| 2009/0163137 A1* | 6/2009 | Capparelli et al. ........... 455/3.06 |
| 2009/0165054 A1 | 6/2009 | Rudolph |
| 2009/0172720 A1* | 7/2009 | Kiiskinen et al. ................. 725/9 |
| 2009/0183206 A1* | 7/2009 | Lee et al. ........................ 725/56 |
| 2009/0249398 A1* | 10/2009 | Cirrincione et al. ............ 725/43 |
| 2009/0328115 A1* | 12/2009 | Malik .............................. 725/93 |
| 2010/0017824 A1* | 1/2010 | Malik .............................. 725/46 |
| 2010/0043034 A1* | 2/2010 | Li et al. ........................... 725/87 |
| 2010/0050227 A1 | 2/2010 | Acharya et al. |
| 2010/0058405 A1* | 3/2010 | Ramakrishnan et al. ........ 725/97 |
| 2010/0111085 A1* | 5/2010 | Bauchot et al. ............... 370/390 |
| 2010/0316050 A1* | 12/2010 | Baykal et al. ................. 370/390 |
| 2010/0333143 A1* | 12/2010 | Civanlar et al. ................. 725/54 |
| 2011/0041148 A1* | 2/2011 | Piepenbrink et al. ........... 725/28 |
| 2011/0075663 A1* | 3/2011 | Serbest ......................... 370/390 |

* cited by examiner

| REGION ID 702 | BASE MULTICAST IP 704 |
|---|---|
| N1 | A1.B1.C1.D1 |
| N2 | A2.B2.C2.D2 |
| ... | ... |
| NK | AK.BK.CK.DK |

710 → (row N1)
720 → (row N2)

| DAY 752 | MULTICAST IP 754 | PORT (BIG-ENDIAN) 756 | PORT (LITTLE-ENDIAN) 758 |
|---|---|---|---|
| TODAY | A.B.C.D | BP | LP |
| TODAY +1 | A.B.C.D +1 | BP | LP |
| TODAY +2 | A.B.C.D +2 | BP | LP |
| TODAY +3 | A.B.C.D +3 | BP | LP |
| TODAY +4 | A.B.C.D +4 | ... | ... |
| TODAY +9 | A.B.C.D +9 | BP | LP |

DATA DISTRIBUTION

RELATED APPLICATION

This application is a continuation-in-part (CIP) of U.S. patent application Ser. No. 12/579,570 filed Oct. 15, 2009, entitled "Data Distribution," the disclosure of which is hereby incorporated herein by reference.

BACKGROUND INFORMATION

Service providers, such as telecommunication service providers, often download information to customers in a unicast manner. One drawback with distributing information in this manner is that the downloaded data consumes significant network bandwidth. When the programming service provider has thousands of customers, the service provider is also forced to expend significant processing resources in providing the information of interest to the customers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to downloading data to a number of receivers using a multicast transmission protocol, such as an Internet Protocol (IP) multicast. Use of IP multicast may allow for efficient utilization of network bandwidth resources and minimizing use of various network resources. In one exemplary implementation, a set top box, a television card or cable card may receive programming guide data multicast over a number of different channels over a period of time. In some implementations, the receiver (e.g., set top box) may communicate with other receivers located in a same customer premises to synchronize the downloading of the multicast data.

Figure 1:
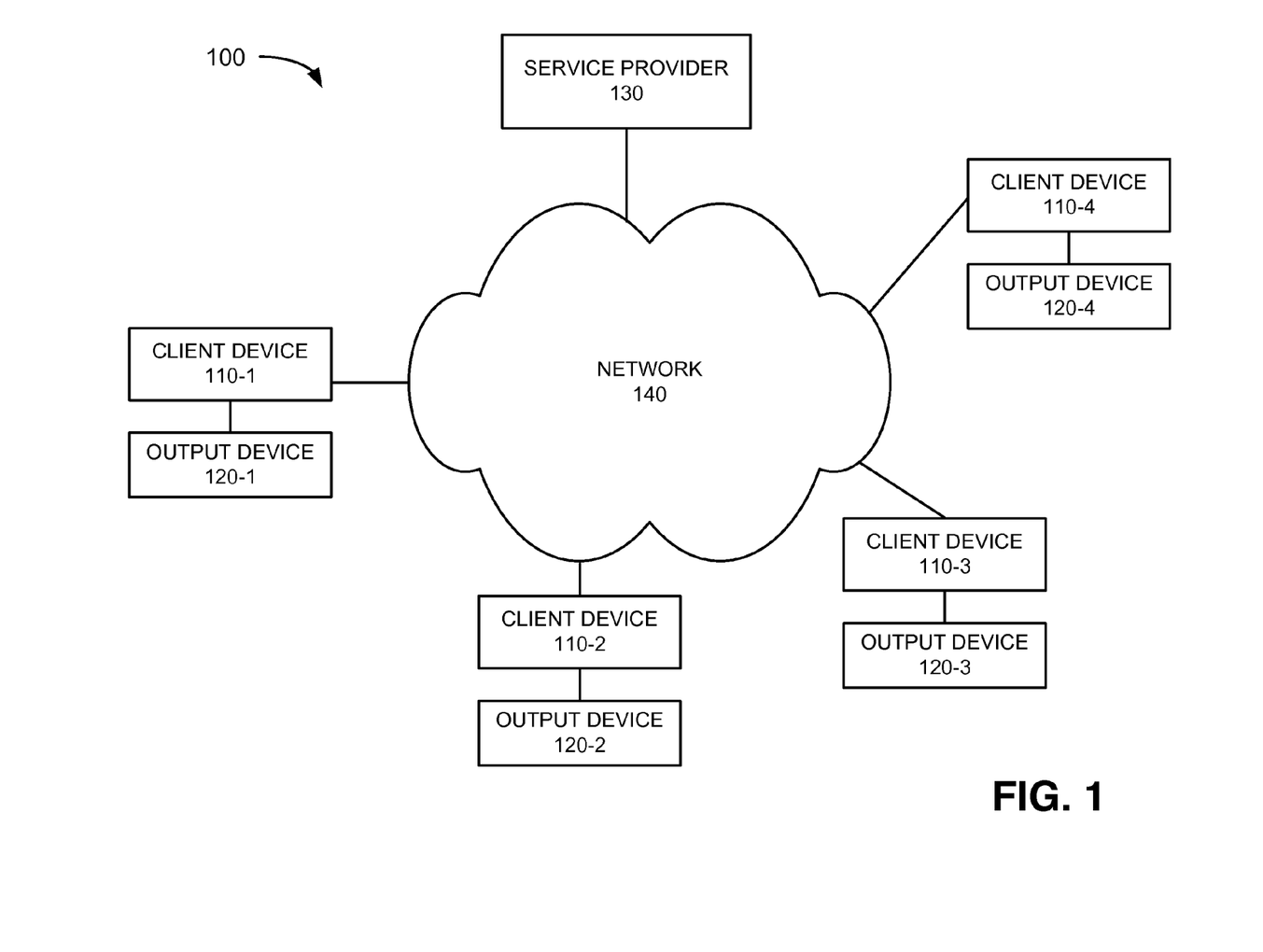
FIG. 1 illustrates an exemplary network in which systems and methods described herein may be implemented.

FIG. 1 is a block diagram of an exemplary network 100 in which systems and methods described herein may be implemented. Network 100 may include a number of client devices 110-1 through 110-4, referred to individually as client device 110 or client device 110-N (where N represents any integer value) and collectively as client devices 110. Network 100 may also include output devices 120-1 through 120-4, referred to individually as output device 120 or output device 120-N (where N represents any integer value) and collectively as output devices 120. Network 100 may further include service provider 130 and network 140.

Each of client devices 110 may include any type of device that is able to receive data, such as text data, video data, image data, audio data, multi-media data, etc., transmitted from a source, such as service provider 130. Each of client devices 110 may decode the data and output the data to an output device, such as output device 120, for viewing or playing. In an exemplary implementation, each of client devices 110 may include a set top box (STB) used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, one or more of client devices 110 may forward the decoded data for viewing or playing by another device, such as output device 120. In other implementations, one or more of client devices 110 may play and display the decoded media.

For example, in some implementations, one or more of client devices 110 may include some type of computer, such as a personal computer (PC), laptop computer, home theater PC (HTPC), etc., that is able to receive incoming data and decode the incoming data for output to a display, which may be included with client device 110. In this instance, a client device 110 may include logic, such as a cable card, television card or other logic, to interface with service provider 130.

Each of output devices 120 may include any device that is able to output/display various media, such as a television, monitor, PC, laptop computer, HTPC, a personal digital assistant (PDA), a web-based appliance, a mobile terminal (e.g., a cellular telephone), etc. In an exemplary implementation, output device 120 may receive multi-media data from client device 110 and display or play the media.

Service provider 130 may include one or more computing devices, servers and/or backend systems that are able to connect to network 140 and transmit and/or receive information via network 140. In an exemplary implementation, service provider 130 may provide multi-media information, such as television programming, movies, sporting events, podcasts or other media presentations to client devices 110 for output to a user/viewer. Service provider 130 may also multicast various data, such as program guide data associated with television programming, to client devices 110, as described in detail below.

Network 140 may include one or more wired, wireless and/or optical networks that are capable of receiving and transmitting data, voice and/or video signals, including multi-media signals that include voice, data and video information. For example, network 140 may include one or more public switched telephone networks (PSTNs) or other type of switched network. Network 140 may also include one or more wireless networks and may include a number of transmission towers for receiving wireless signals and forwarding the wireless signals toward the intended destinations. Network 140 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, four client devices 110 and four output devices 120 are shown for simplicity. It should be understood that network 100 may include hundreds or thousands of client devices 110 and output devices 120. Network 100 may also include additional elements, such as switches, gateways, routers, backend systems, etc., that aid in routing information, such as media streams from service provider 130 to client devices 110. In addition, although client device 110 and output device 120 are shown as separate devices in FIG. 1, in other implementations, the functions performed by two or more of these devices may be performed by a single device or platform.

Figure 2:
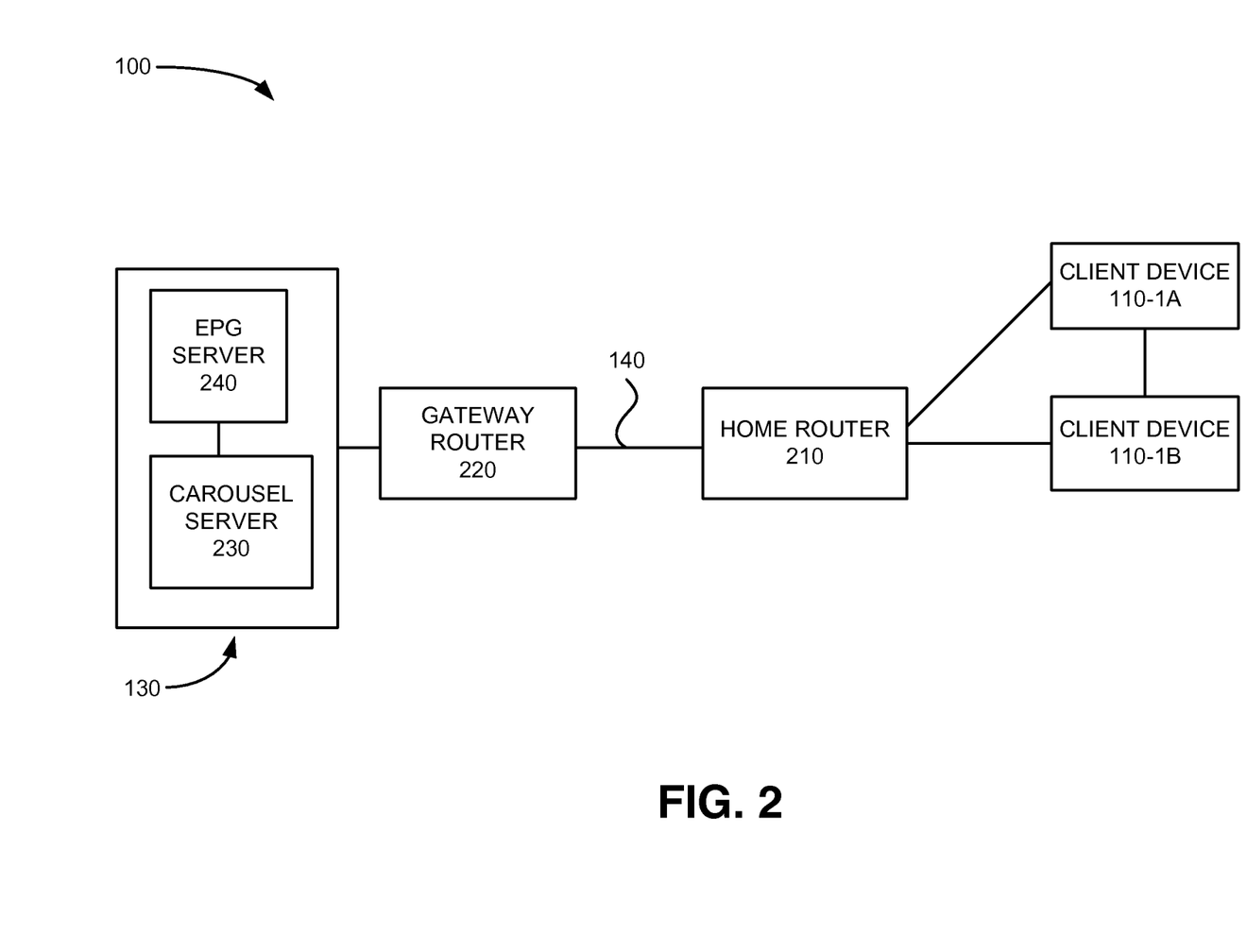
FIG. 2 illustrates an exemplary configuration of components implemented in the network of FIG. 1.

FIG. 2 illustrates exemplary components implemented in a portion of network 100. Referring to FIG. 2, network 100 may include client device 110-1A and 110-1B (also referred to as STBs 110-1A and 110-1B), home router 210, gateway router 220, carousel server 230 and electronic program guide (EPG) server 240. Other device, such as output devices 120 are not illustrated in FIG. 2 for simplicity.

In an exemplary implementation, home router 210 and STBs 110-1A and 110-1B (referred to collectively as STBs 110-1) are located at a customer premises, such as a customer's home, and may be connected via a LAN. Home router 210, also referred to herein as broadband home router (BHR) 210, may act as a hub for communications entering and exiting the customer's premises. For example, service provider 130 may communicate with one or more devices in a customer's home, such as STBs 110-1A and 1B via network 140 and BHR 210. As an example, BHR 210 may communicate with STBs 110-1A and 110-1B to provide program guide data received from service provider 130, as described in detail below. Similarly, BHR 210 may communicate information on behalf of STBs 110 to one or more devices at service provider 130 via network 140.

Gateway router 220 may be located at service provider 130 or elsewhere in network 100. Gateway router 220 may facilitate communications between service provider 130 and BHR 210. For example, gateway router 220 may transmit media streams from service provider 130 to BHR 210 via network 140. Gateway router 220 may also receive requests and other information from a customer premises transmitted by BHR 210 via network 140, as also described in detail below.

Service provider 130 may include carousel server 230 and EPG server 240. Carousel server 230 may access an electronic program guide (EPG) stored in EPG server 240 and provide the EPG to STBs 110-1 for display to customers. In an exemplary implementation, carousel server 230 may multicast the EPG to a large number of STBs associated with customer locations, as described in detail below. In addition, carousel server 230 may multicast the EPG data via repeating carousel intervals. That is, carousel server 230 may multicast the data, loop back to the start and repeat the multicasting of the data. This may allow a receiver device (e.g., STB 110) to join the multicast group in the middle of a carousel interval and be able to receive all of the data by continuing to "listen" until the entire file is received.

Figure 3:
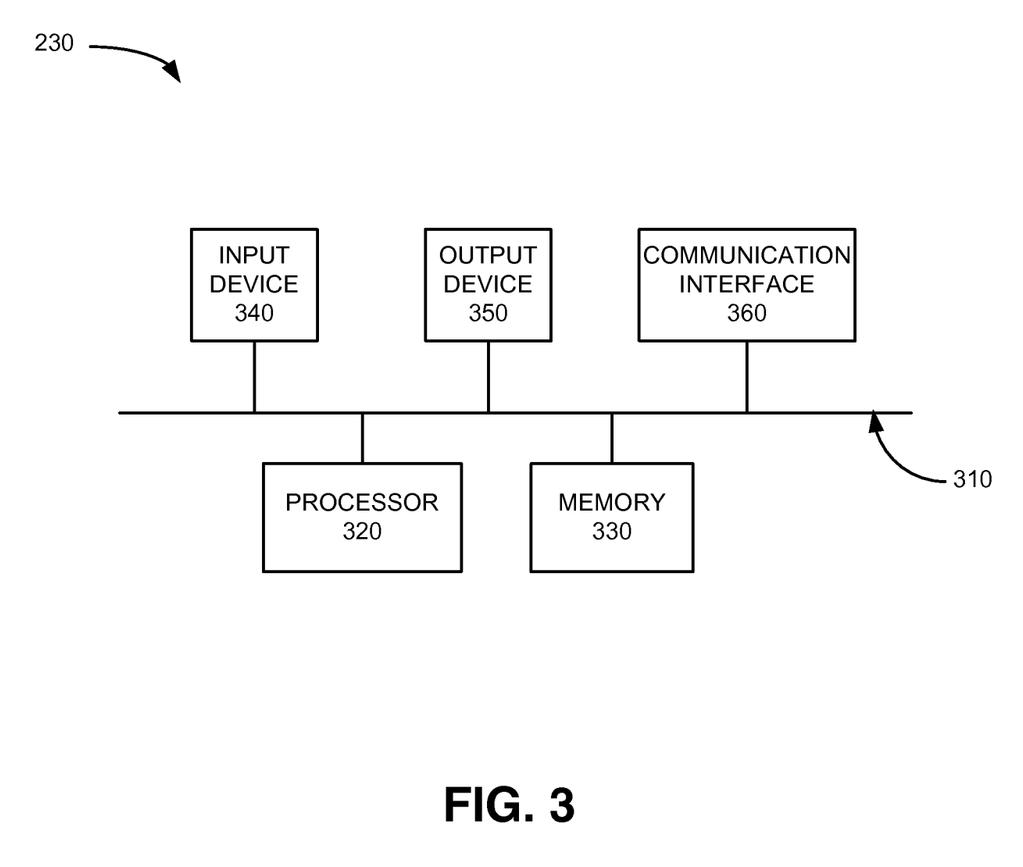
FIG. 3 illustrates an exemplary configuration of one or more of the components of FIG. 2.

FIG. 3 illustrates an exemplary configuration of carousel server 230. Other devices in network 100, such as client devices 110, home router 210, gateway router 220 and EPG server 240 may be configured in a similar manner. Referring to FIG. 3, carousel server 230 may include a bus 310, a processor 320, a memory 330, an input device 340, an output device 350 and a communication interface 360. Bus 310 may include a path that permits communication among the elements of carousel server 230.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive. In an exemplary implementation, memory 330 may store EPG data to be multicast to client devices 110, as described in detail below.

Input device 340 may include a mechanism that permits a user to input information to carousel server 230, such as a keyboard, a keypad, a mouse, a pen, a microphone, a touch screen, voice recognition and/or biometric mechanisms, etc. Input device 340 may also include mechanisms for receiving input via a remote control device which sends commands to carousel server 330 via IR or radio frequency signals. Output device 350 may include a mechanism that outputs information to the user, including a display, a printer, a speaker, etc.

Communication interface 360 may include a transceiver that carousel server 230 may use to communicate with other devices (e.g., client devices 110, BHR 210, gateway router 220, EPG server 240, etc). For example, communication interface 360 may include mechanisms for communicating with client devices 110 via wired, wireless or optical mechanisms. For example, communication interface 360 may output received television programming data to client devices 110 for output via output devices 120. Communication interface 360 may also include one or more radio frequency (RF) transmitters, receivers and/or transceivers and one or more antennas for transmitting and receiving RF data via network 140. Communication interface 360 may also include a modem or an Ethernet interface to a LAN or other mechanisms for communicating via a network, such as network 140 or another network via which carousel server 230 communicates with other devices/systems.

The exemplary configuration illustrated in FIG. 3 is provided for simplicity. It should be understood that carousel server 230 and/or client device 110, output device 120, home router 210, gateway router 220 and EPG server 240 may include more or fewer components than illustrated in FIG. 3. For example, various modulating, demodulating, coding and/or decoding components, one or more power supplies or other components may be included in one or more of carousel server 230, EPG server 240, gateway router 220, home router 210, output devices 120 and client devices 110.

Carousel server 230 and other devices in network 100 (e.g., client device 110) may perform operations in response to their respective processors 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
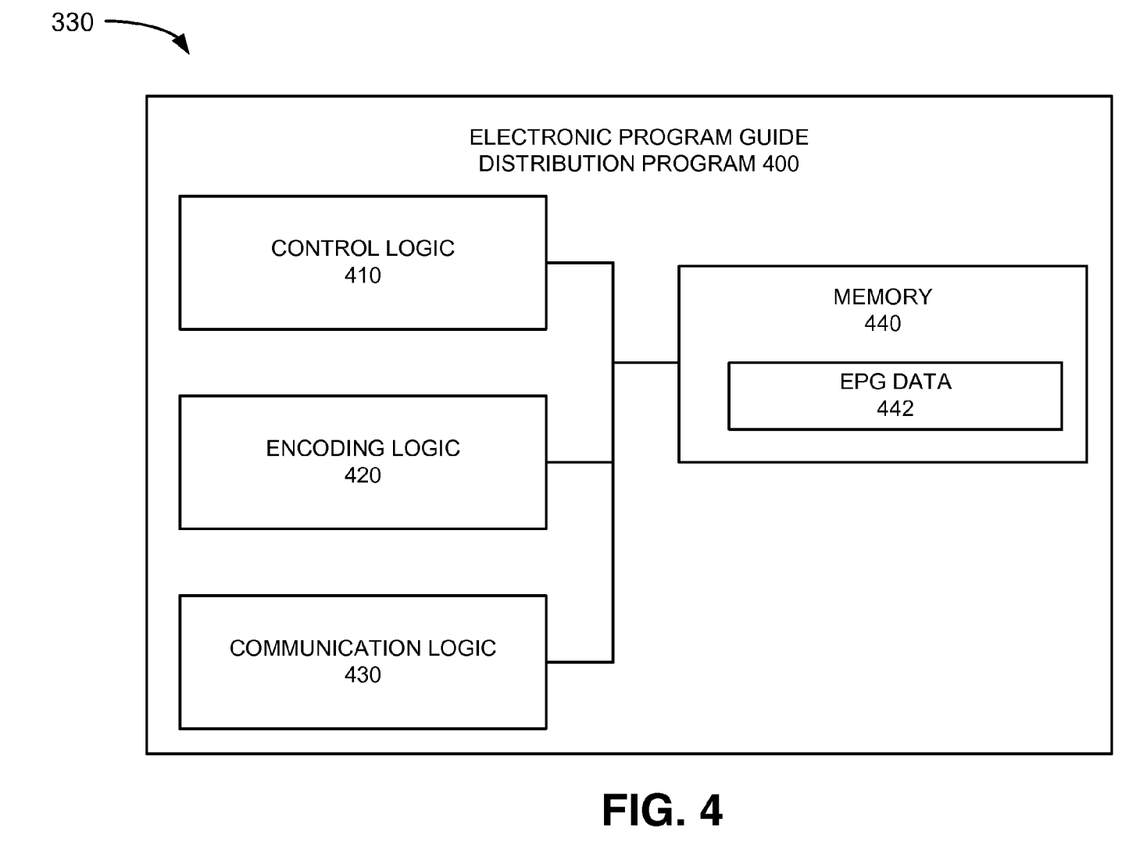
FIG. 4 illustrates an exemplary configuration of logic components implemented in the service provider of FIG. 1.

FIG. 4 is an exemplary functional block diagram of components implemented in carousel server 230 of FIG. 3. In an exemplary implementation, all or some of the components illustrated in FIG. 4 may be stored in memory 330. For example, referring to FIG. 4, memory 330 of carousel server 230 may include electronic program guide (EPG) distribution program 400.

EPG distribution program 400 may include a software program executed by processor 320 that allows carousel server 230 to multicast television programming guide information to client devices 110. In an exemplary implementation, EPG distribution program 400 may include control logic 410, encoding logic 420, communication logic 430 and memory 440.

Control logic 410 may include logic for controlling the operation of EPG distribution program 400. For example, control logic 410 may control the multicasting of program guide data that will be displayed to users via client devices 110 and/or output devices 120. By using multicasting, such as IP multicasting, to distribute guide data, control logic 410 may enable carousel server 230 to send common content to a large number of receiver devices (e.g., client devices 110) without carousel server 230 having to interact with and/or establish sessions with the receiver devices (e.g., client devices 110).

Encoding logic 420 may include logic to encode data, such as the EPG data, to enable reliable delivery of the data to client devices 110. For example, in one implementation, encoding logic 420 may encode the EPG data into data blocks or packets having predetermined sizes that enable the transmission of the data over IP multicast. In this implementation, each packet includes a sequence number that enables the receiver device (e.g., client devices 110) to receive data packets/block out of order and re-sequence the data packets into the correct order.

Communication logic 430 may include logic for transmitting data via one or more multicast communication channels. For example, in one implementation, communication logic 430 may use multiple channels to transmit the EPG to client devices 110.

Memory 440 may include one or more memories for storing data to be broadcast to client devices 110. For example, memory 440 may include EPG data 442 that includes television programming guide information for display by client devices 110 and/or output devices 120. EPG data 442 may be obtained from EPG server 240.

EPG distribution program 400 may multicast programming information and other information that enables client devices 110 to assemble a program guide, detect missing information and detect corrupted data, as described in detail below. More particularly, encoding logic 420 may use a data block encoding scheme that enable client devices 110 to detect lost blocks, and re-sequence blocks received out of order. EPG distribution program 400 also enables client devices 110 to interact with service provider 130 to ensure that the client devices 110 have the required information, as described in detail below.

Figure 5:
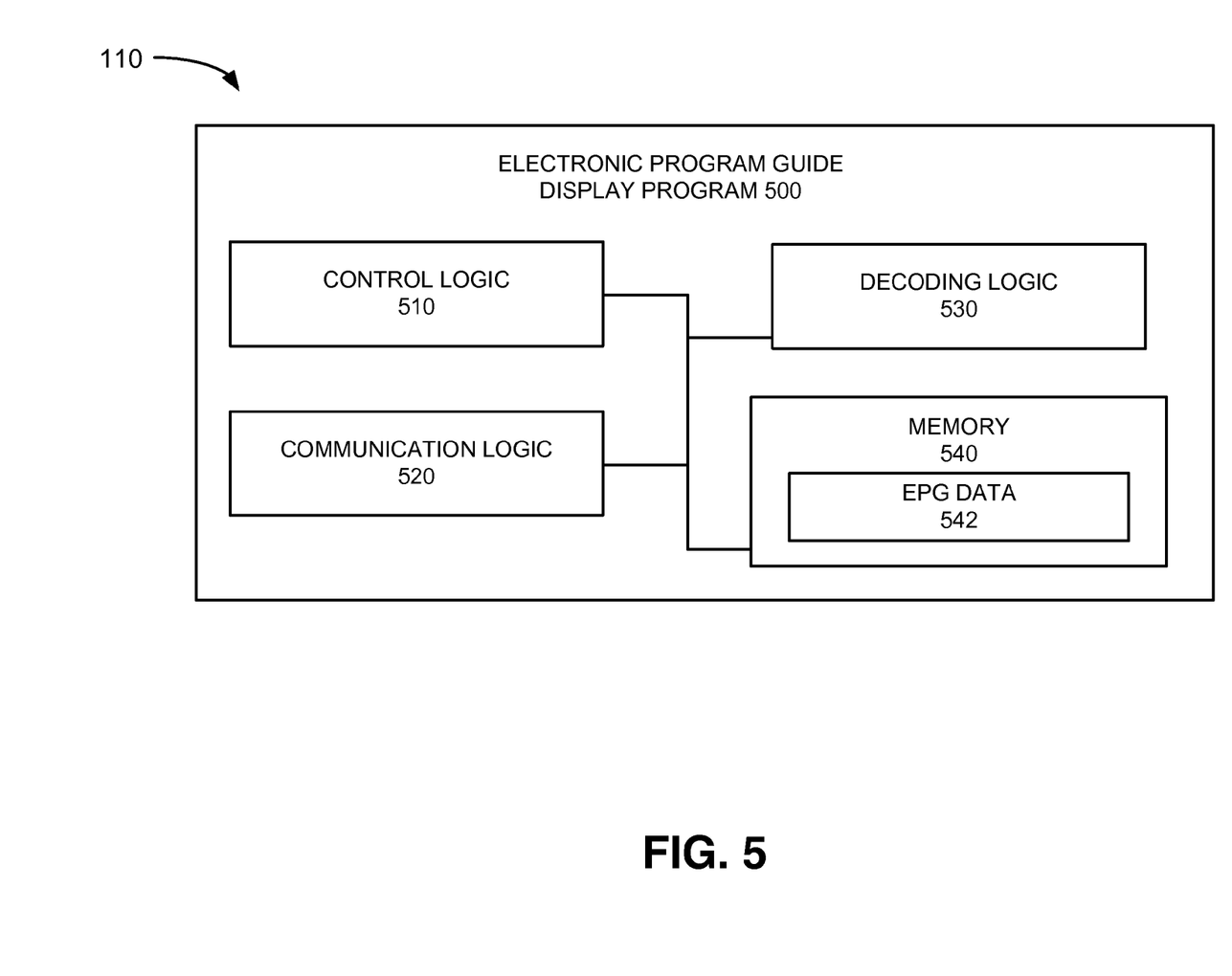
FIG. 5 illustrates an exemplary configuration of logic components implemented in the client device of FIG. 1.

FIG. 5 is an exemplary functional block diagram of components implemented in client devices 110 of FIG. 2. In an exemplary implementation, all or some of the components illustrated in FIG. 5 may be stored in memory 330 of client device 110. Referring to FIG. 5, client device 110 may include EPG display program 500.

EPG display program 500 may include a software program executed by processor 320 of client device 110 that allows client device 110 to receive and display television programming guide information. In an exemplary implementation, EPG display program 500 may include control logic 510, communication logic 520, decoding logic 530 and memory 540.

Control logic 510 may include logic for controlling the operation of client device 110. For example, control logic 510 may control the reception and display of EPG data that will be output to users via, for example, output device 120.

Communication logic 520 may include logic for receiving data via one or more multicast communication channels. For example, in one implementation, communication logic 520 may receive EPG data transmitted by carousel server 230 over a number of multicast channels. In addition, communication logic 520 may include logic for transmitting requests to carousel server 230, such as requests for missing portions of the EPG.

Decoding logic 530 may include logic to decode data, such as EPG data, to enable the received data to be displayed. For example, in one implementation, decoding logic 530 may decode the EPG data for display by output device 120.

Memory 540 may include one or more memories for storing data transmitted from service provider 130. For example, memory 540 may include EPG data 542 that stores television programming guide information for display by client device 110 and/or output device 120. In an exemplary implementation, EPG display program 500 may interact with carousel server 230 to display television programming information, as described in detail below.

In an exemplary implementation, client device 110 and/or EPG display program 500 may be a domain name system (DNS) client that supports Internet Group Management Protocol version 3 (IGMPv3) with source specific multicast (SSM) joins/reports/leaves or IGMPv2. In either case, EPG display program 500 and/or client 110 may be a DNS client that is able to resolve a server identified by a DNS name, such as a server associated with service provider 130, to an IP address.

In addition, EPG display program 500 may support the configuration of multicast channels on which program guide data will be transmitted, enable the configuration of an association between a multicast channel and a program guide data file ID and support the provisioning of carousel server 230's address as an IP address and/or DNS name. EPG display program 500 may further support the provisioning of carousel server 230's IP address/DNS name with a multicast group, as described in more detail below.

Figure 6:
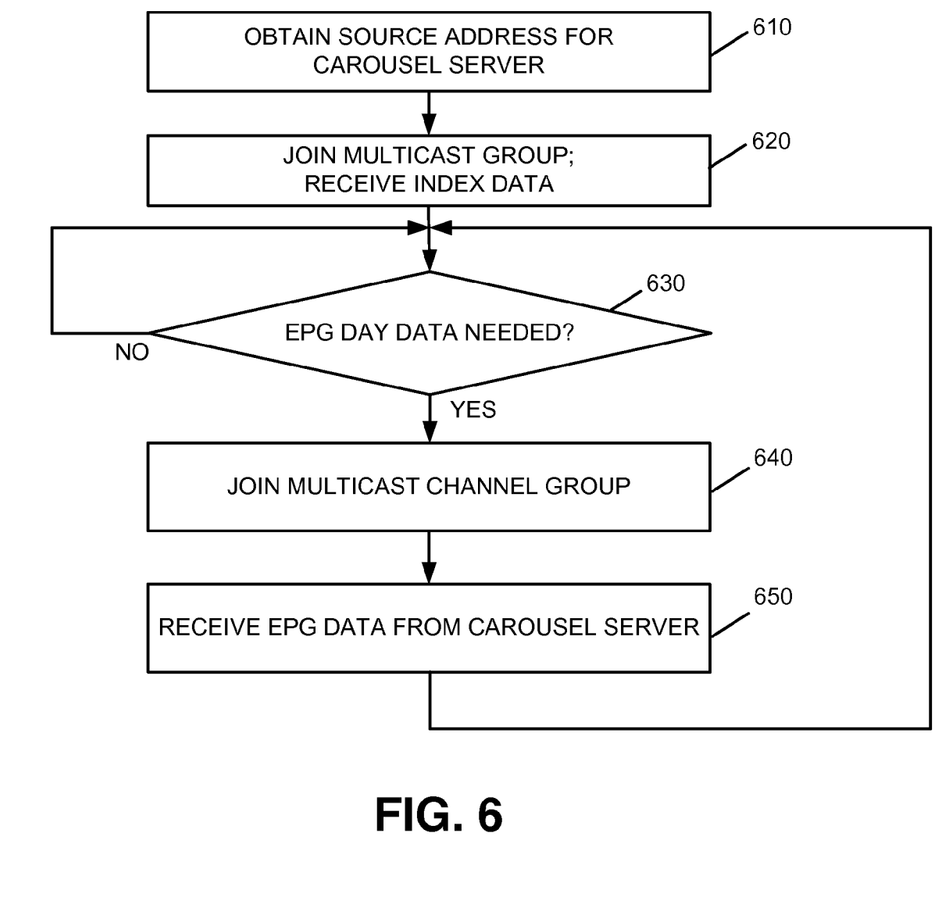
FIG. 6 is a flow diagram illustrating exemplary processing associated with the network of FIG. 2.

FIG. 6 is a flow diagram illustrating exemplary processing associated with the network of FIG. 2. In this example, assume that carousel server 230 executes EPG distribution program 400 to provide program guide data and that client devices 110 execute EPG display program 500 to receive, decode and display the program guide data to users via output devices 120. Processing may begin with client device 110 obtaining the source address of the device that will be multicasting the data (i.e., carousel server 230 in this example) and the base multicast group address of an index channel associated with an index for the electronic program guide (block 610). In an exemplary implementation, processing associated with obtaining the source address and multicast group address of the index channel takes place outside the multicast arena and may be part of a client device/STB 110 initialization procedure.

For example, referring to FIG. 2, STB 110-1A may send a request to service provider 130 for the source address of carousel server 230 and the base multicast group address associated with an index channel. An index channel, as used herein, refers to an IP multicast channel (IPMC) that includes an IP multicast address and a port number. The IPMC operates to multicast an index associated with the electronic program guide to STBs 110-1. Other channels may be used to multicast program guide data associated with, for example, one day of programming provided by service provider 130. Carousel server 230 may also multicast the index data and program guide data in different time periods or slices, as described in more detail below.

In this example, assume that carousel server 230 transmits the requested information to STB 110-1A and that STB 110-1A receives the source address and multicast group address of the IPMC. STB 110-1A may send a request to join the multicast group associated with the IPMC at carousel server 230. In this case, assume that the join request is accepted (block 620). In an exemplary implementation, gateway router 220 handles IGMP join requests on behalf of service provider 130. As discussed above, in one exemplary implementation, carousel server 230 multicasts the index data and guide data in slices over a period of time. For example, carousel server 230 may multicast the index data in one time period followed by multicasting the program guide data in one day portions (e.g., multicasting one day of the program guide data) in subsequent periods of time. Assume that STB 110-1A receives the index data (block 620).

Figure 7A:
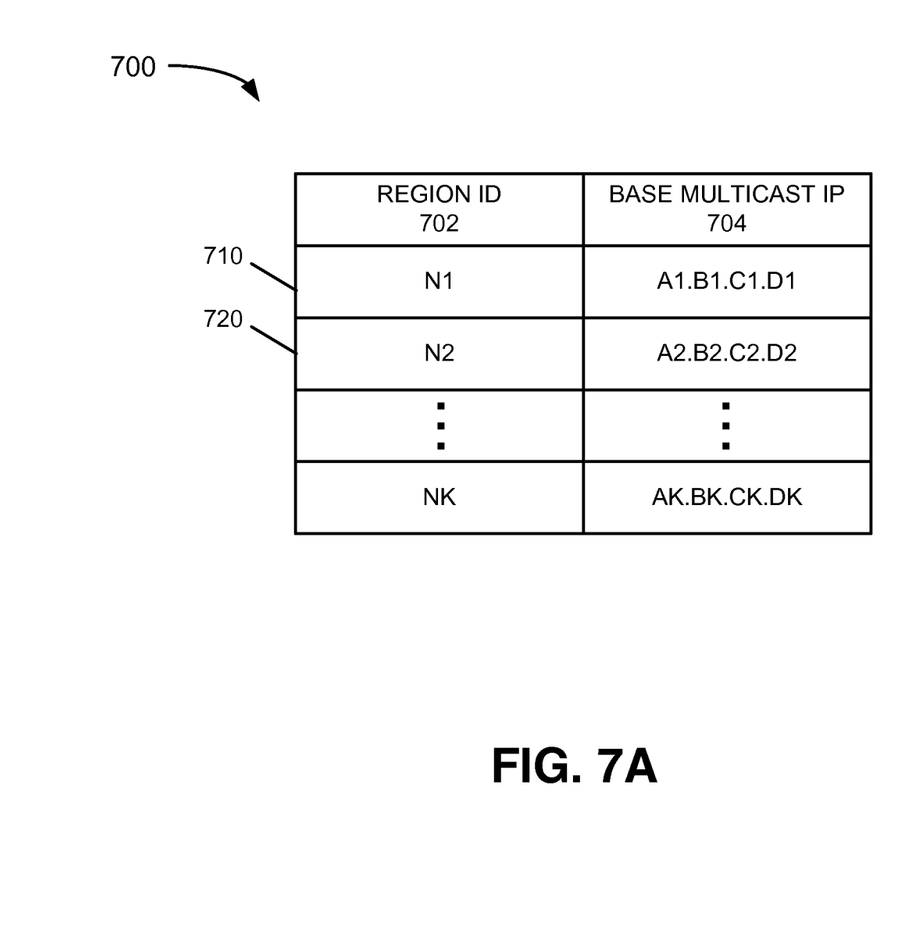
FIG. 7A illustrates an exemplary data table consistent with aspects of the invention.

In an exemplary implementation, carousel server 230 may transmit a region identification (ID) mapping table (RMT) and a channel listing table (CLT) with the index data. For example, FIG. 7A illustrates an exemplary RMT 700 downloaded with the index data. Referring to FIG. 7A, RMT 700 includes a region ID field 702 and a base multicast IP field 704. Region ID field 702 includes region IDs, identified as N1, N2, N3, etc. Base multicast IP field 704 includes IP addresses A.B.C.D, where A, B, C and D represent integer values associated with the appropriate IP multicast address. For example, field 702 in entry 710 indicates that for region N1, the corresponding base multicast address is A1.B1.C1.D1.

Control logic 510 may identify the region ID in field 702 that corresponds to the region in which STB 110-1A is located and identify the base multicast address in field 704 corresponding to the region ID of STB 110-1A. For example, each STB 110 may be encoded with a region ID. Based on the region ID stored in STB 110-1A, STB 110-1A may identify the appropriate multicast group information from RMT 700 in field 704. Using different base multicast IP addresses for different geographical regions enables service provider 130/carousel server 230 to distribute the load with respect to providing EPG data to STBs 110 located in different regions.

Control logic 510 of EPG display program 500 may then determine whether STB 110-1A needs to download program guide data for one or more days (block 630). For example, EPG display program 500 may be designed to store EPG data associated with television programming that will be provided over a period of time, such as ten days. If EPG data is not needed (block 630—no) (e.g., ten days of EPG data is stored in EPG display program 500), STB 110-1A may periodically monitor (e.g., once a day) whether additional EPG data is needed at later times.

Figure 7B:
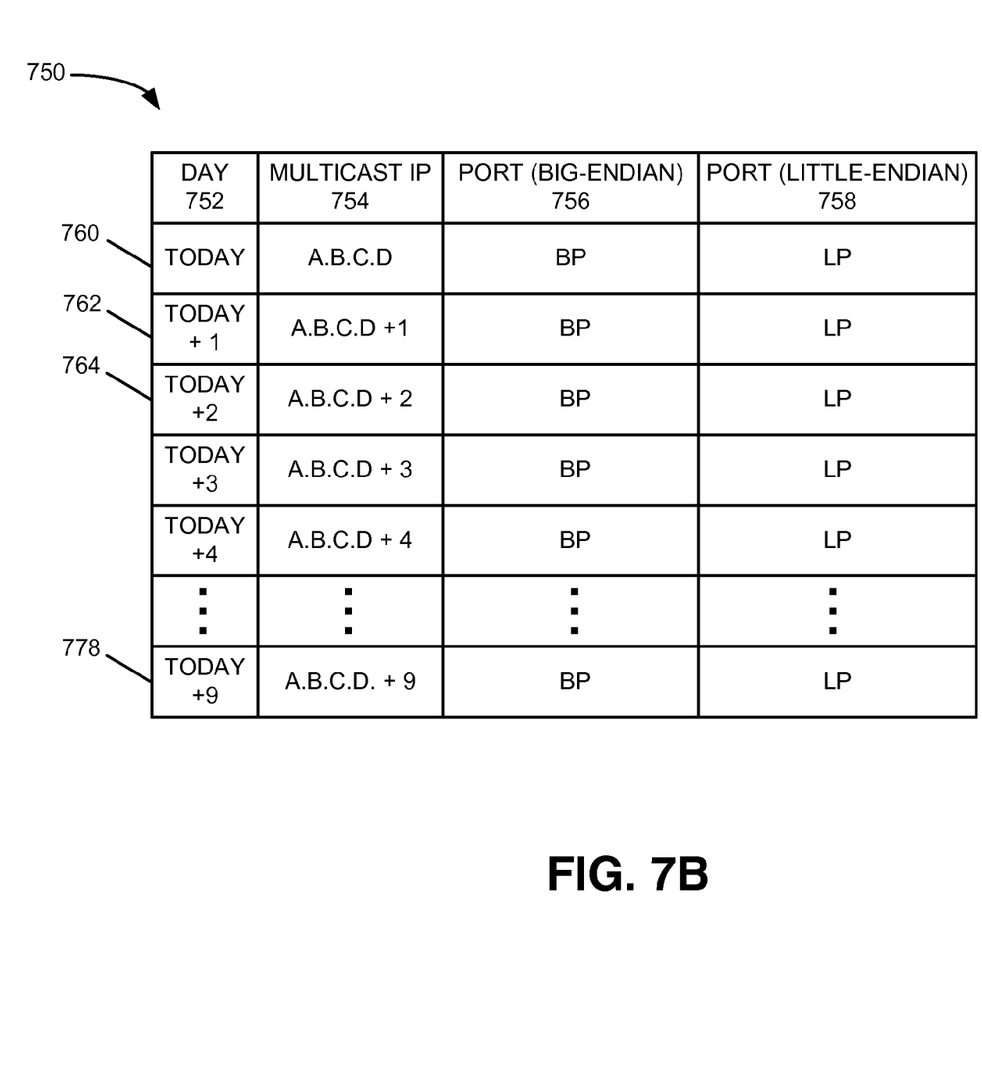
FIG. 7B illustrates an exemplary table associated with generating multicast address information consistent with aspects of the invention.

If, however, EPG day data is needed (e.g., ten days of EPG data is not stored in EPG display program 500) (block 630—yes), STB 110-1A may join the multicast group for receiving the appropriate day data (block 640). In an exemplary implementation, carousel server 230 may multicast each day of data via a different multicast channel. In such an implementation, EPG display program 500 may store a mapping table that maps each day of data to a different multicast IP address, as illustrated in FIG. 7B. Referring to FIG. 7B, table 750 includes a day field 752, a multicast IP field 754, port field 756 and port field 758.

Day field 752 indicates the particular day of EPG data, where "today" in entry 760 represents the current day, today+1 in entry 762 represents tomorrow, etc. Multicast IP field 754 for entry 760 indicates the multicast address for the channel on which the current day's program guide data will be transmitted is A.B.C.D (where A, B, C and D represent integer values associated with the appropriate IP address). In one implementation, the base multicast IP address in field 754 of entry 760 corresponds to the base multicast IP address associated with the IPMC. That is, the IPMC may transmit the index data and the current day of programming information. The base multicast address associated with the next day's data is A.B.C.D.+1, identified in field 754 of entry 762, the multicast address with the subsequent day (i.e., day 3) is A.B.C.D.+2, identified in field 754 of entry 764, etc., up through the base multicast address of A.B.C.D.+9 identified in field 754 of entry 778 for the tenth day of data.

Port field 756 and port field 758 correspond to big endian and little endian port numbers, respectively. Entries in fields 756 and 758 in table are illustrated as big port (BP) and little port (LP), respectively, were BP and LP are integer values corresponding to the appropriate ports on carousel server 230. Both BP and LP are known to STB 110-1A and are configurable. That is, STB 110-1A may be pre-programmed to use the big-endian port number BP or the little endian port number LP for particular multicast channels. By arranging both big-endian and little-endian streams in the same group, carousel server 230 may reduce the IGMP join requests to a particular port by about 50 percent. That is, half of the join requests may be associated with port field 756 and the other half may be associated with port 758. Use of big-endian and little-endian streams also simplifies in-home synchronization, described below, which may be dependent on the type of endianism.

Referring back to FIG. 6, assume that control logic 510 determines that it needs program guide data associated with the current day (i.e., today). In this case, control logic 510 may identify the corresponding base multicast IP address of A.B.C.D from field 754 of entry 760 in table 750, join the appropriate multicast group and begin "listening" for the multicast EPG data (block 640). STB 110-1A may then download the appropriate EPG data (block 650).

STB 110-1A may then construct the EPG by incorporating the current day's program data with the index data previously downloaded. Processing may return to block 630 with STB 110-1A determining whether any additional EPG day data is needed. If so, control logic 510 may identify the appropriate day of data need in field 752, identify the corresponding multicast IP address associated with the day that is needed in field 754 and port number in field 756 or 758, join the appropriate multicast group and listen for and download the day data that is needed. Processing may continue in this manner until EPG display program 500 stores ten days of program guide information.

As described above, STB 110-1A may join a multicast group to receive the day data. In an exemplary implementation, STB 110-1A may randomize the time for joining the multicast group to reduce the chance of overloading a network caused by too many STBs 110 attempting to join a multicast group at the same time. For example, STBs 110 may randomize the time for joining a multicast group over a three hour window. As an example, upon start-up, STB 110-1A may start a timer having a random value between 0 and 180 minutes. After the timer has expired, STB 110-1A may join the multicast group needed to obtain the EPG data, as described above. As also discussed above, carousel server 230 may multicast the index data at a first time, followed by multicasting day data every predetermined period of time, such as one hour, after the index data is multicast. In this manner, carousel server 230 may distribute the load with respect to multicasting data to STBs and STB 110-1A may receive the index data and each day of data at the predetermined times.

Figure 8A:
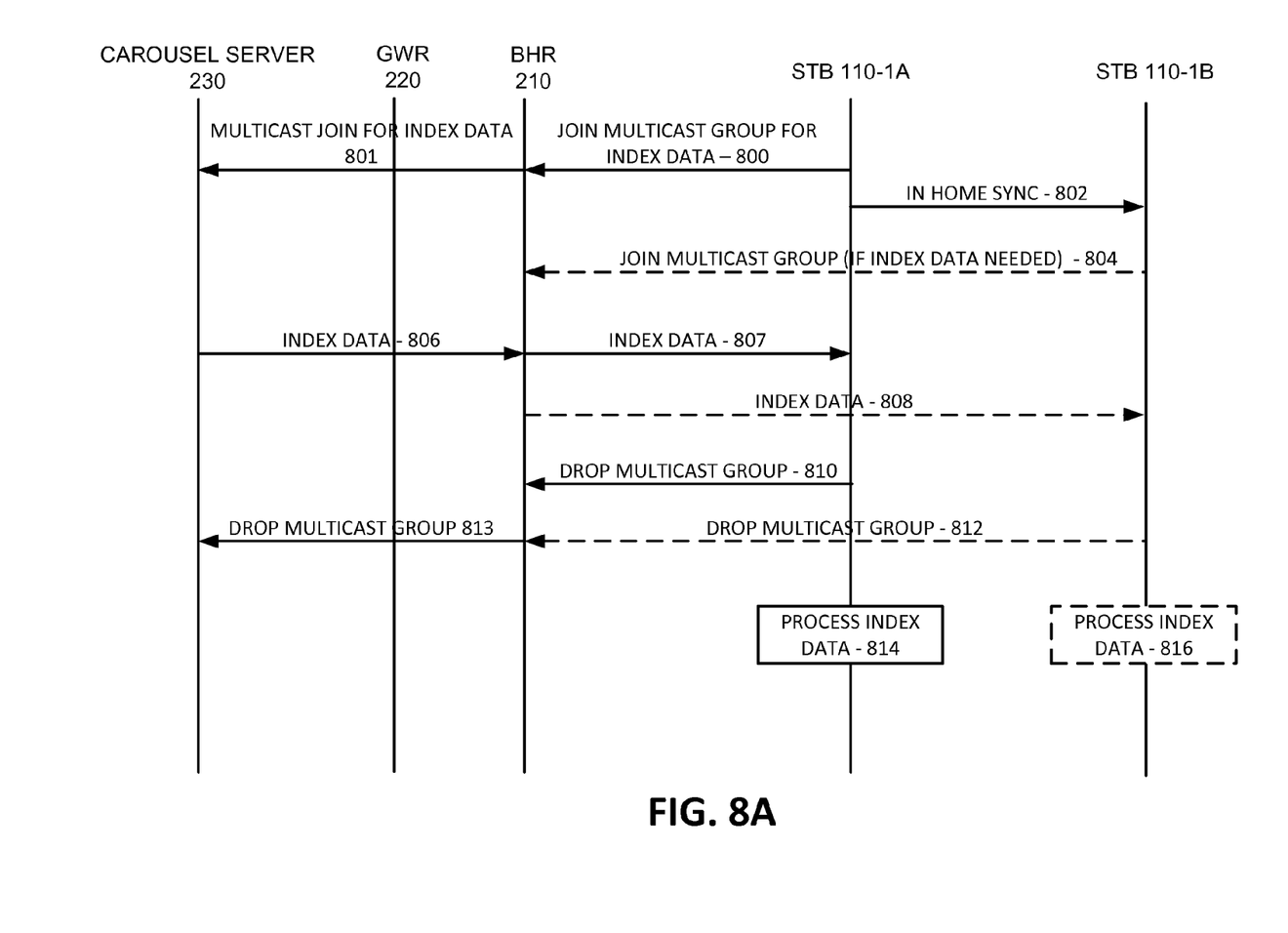
FIGS. 8A and 8B are signal flow diagrams associated with the processing of FIG. 6.
Figure 8B:
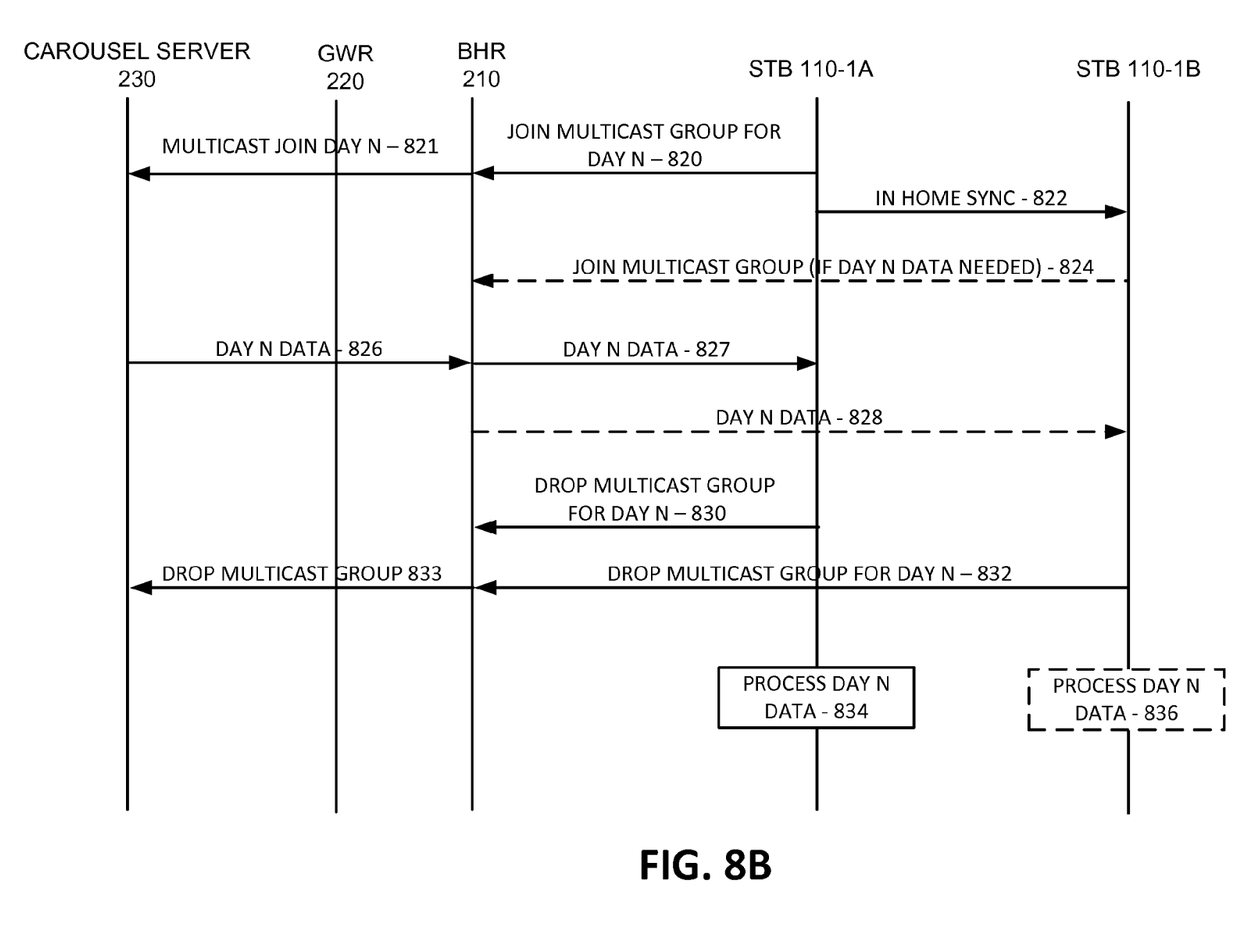

In addition, in an exemplary implementation, STBs 110 within a given household attempt to synchronize the joining of a multicast group and downloading EPG data. For example, FIGS. 8A and 8B are signal flow diagrams illustrating in-home synchronization between STBs 110 within a home or customer premises. Referring to FIG. 8A, assume that STB 110-1A determines that it needs EPG index data and sends a join request (FIG. 8A, 800) to carousel server 230. For example, STB 110-1A may send the join request to BHR 210, which acts as a hub for communications to carousel server 230. BHR 210 may forward the multicast join to carousel server 230 (801). At substantially the same time that STB 110-1A determines that it needs EPG index data, STB 110-1A sends an in home synchronization message to STB 110-1B (802) to announce the join to other STBs 110 located in the home network (e.g., other STBs 110 connected to the same BHR, such as STB 110-1B in FIG. 2). In this manner, other STBs 110 may receive the join information from a first STB 110 as a notification or wake-up message to join the multicast group.

In this case, when STB 110-1B receives the join notification broadcasted by STB 110-1A, STB 110-1B may determine whether it needs any data (e.g., index data) and if so, STB 110-1B may also join the same multicast group to receive/download the same data (804). STBs 110-1A and 110-1B may then receive EPG index data from carousel server 230 at the same time. For example, carousel server 230 may multicast the index data to BHR 210 (806) and BHR 210 may forward the data to STBs 110-1A and 110-1B (807, 808). After receiving the entire index data for the EPG, STBs 110-1A and 110-1B may send a drop multicast group message to BHR (810, 812), which forwards the drop multicast group message to carousel server 230 (813). That is, when STBs 110-1A and/or 110-1B has correctly received all data blocks associated with the index, client devices 110-1A and/or 110-1B may exit the multicast group. STBs 110-1A and 110-B may process the index data (814, 816).

Similarly, when STB 110-1A determines that it needs EPG day data, STB 110-1A sends a join request to BHR 210 (FIG. 8B, 820), which forwards the request to carousel server 230. At substantially the same time that STB 110-1A determines that it needs EPG day data, STB 110-1A sends an in home synchronization message to STB 110-1B (822) to announce the join to other STBs 110 located in the home network (e.g., other STBs 110 connected to the same BHR, such as STB 110-1B in FIG. 2). In this manner, other STBs 110 may receive the join information from a first STB as a notification or wake-up message to join the multicast group.

In this case, when STB 110-1B receives the join notification broadcasted by STB 110-1A, STB 110-1B may determine whether it needs any day data and if so, STB 110-1B may also join the same multicast group to receive/download the same data (824). STBs 110-1A and 110-1B may then receive EPG day data from carousel server 230 at the same time. For example, carousel server 230 may multicast the day data to BHR 210 (826) and BHR 210 may forward the data to STBs 110-1A and 110-1B (827, 828). After receiving the entire day of data, STBs 110-1A and 110-1B may send a drop multicast group message to BHR 210 (830, 832), which forwards the drop multicast group message to carousel server 230 (833). That is, when STBs 110-1A and/or 110-1B has correctly received all data blocks associated with the day data, STBs 110-1A and/or 110-1B may exit the multicast group. STBs 110-1A and 110-B may process the day data (834, 836).

In this manner, STBs 110 within a same customer premises (e.g., home, apartment building, office building, etc.) may synchronize the reception of guide data so that they receive the guide data at the same time, thereby making more efficient use of bandwidth between the service provider 130 and the customer premises. In addition, since each of the STBs 110 at a customer premises may join a multicast group at the same time, BHR 210 may issue a single join request to service provider 130, as opposed to submitting multiple join requests for each STB 110.

Thereafter, at scheduled intervals (e.g., every 30 minutes, one hour, etc.), STB 110-1A may join another multicast group to download EPG day data, if the additional day data is needed. For example, STB 110-1A may receive day one (e.g., guide data for the next day) of the EPG data one hour after receiving day 0 (i.e., the current day's EPG data) and each subsequent day one hour after that. In this implementation, ten days of EPG data may be received and downloaded by STB 110-1A (and STB 110-1B) within approximately nine hours from the start time of the multicast of EPG data.

In addition, upon receiving the start of a multicast transmission from carousel server 230, STB 110-1A does not have to wait for the first packet in the sequence of packets to arrive. That is, the reception begins with any segment/packet until all the segments/packets are received. For example, as discussed above, encoding logic 420 of EPG distribution program 400 may encode the EPG data into segments, blocks or packets having a sequence number that enables STB 110-1A to receive data packets/block out of order and re-sequence the data packets into the correct order based on the sequence numbers. Therefore, carousel server 230 may multicast the data on a continuous basis and STB 110-1A "listens" to the multicast stream until all the packets have been received.

In some implementations, if STB 110-1A is unable to join a particular multicast group and/or receive all of the EPG data within a period of time that may be configurable, STB 110-1A may request a TCP-based unicast download of a portion of the EPG data corresponding to the missing portion of the EPG. This prevents STB 110-1A from being unable to download the complete EPG within a reasonable period of time.

Implementations described herein provide for multicasting of information to a number of receiver devices. The multicasting may provide an efficient utilization of network bandwidth resources and may also minimize the use of various processing resources. In an exemplary implementation, a receiver may communicate with other receivers located in a same customer premises to synchronize the downloading of the multicast data. This may further result in more efficient processing at the customer premises.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to multicasting program guide information from service provider 130 to client devices 110. In other implementations, other types of information may be encoded, as described above, for multicast transmission to transceiver devices. In each case, the encoding scheme may allow the transceiver devices to assemble the multicasted data.

In addition, in some implementations, service provider 130 may use multicasting to provide various types of information to client devices 110 based on particular circumstances or scenarios. As an example, service provider 130 (e.g., carousel server 230) may multicast alert type messages, such as weather alerts, missing persons alerts, etc., to particular areas/regions. In such a scenario, all client devices 110 in the particular area/region for which the alert is intended may subscribe to the multicast alert messages so that the alert messages will be "heard" or received by client devices 110.

Further, in implementations described above, client devices 110 located in a same customer premises may synchronize the download of data from service provider 130. In other implementations, once a single client device 110, such as client device 110-1A, receives the complete EPG from service provider 130, that client device 110 may provide the EPG data file to other client devices 110, such as client device 110-1B located on the same LAN (e.g., located in a customer's home). This may save additional resources associated with client devices contacting service provider 130 and issuing join requests to receive the EPG data.

Further, while series of acts and signal flows have been described with respect to FIGS. 6, 8A and 8B, the order of the acts and signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
   a communication interface configured to receive programming information and index data associated with the programming information from a service provider multicast over a plurality of channels, wherein the programming information includes television programming information associated with a plurality of days; and
   logic configured to:
      request address information from the service provider,
      receive the address information, wherein the address information includes a first multicast address,
      join a first multicast group corresponding to the first multicast address, wherein the first multicast group is associated with the index data,
      receive, via the communication interface, the index data,
      identify a second multicast address associated with a first day of television programming information,
      join a second multicast group corresponding to the second multicast address,
      receive, via the communication interface, the first day of television programming information,
      identify a plurality of additional multicast addresses corresponding to other ones of the plurality of days, wherein each of the plurality of additional multicast addresses corresponds to one of the other ones of the plurality of days,
      join a plurality of multicast groups associated with the plurality of additional multicast addresses, and
      receive television programming information for the other ones of the plurality of days via the plurality of multicast groups.

2. The device of claim 1, wherein the address information further comprises region mapping information identifying a plurality of regions and corresponding multicast addresses.

3. The device of claim 2, wherein the logic is further configured to:
   identify the second multicast address corresponding to a region or location associated with the device.

4. The device of claim 1, wherein the logic is further configured to:
   transmit, via the communication interface, a request to the service provider to join the first multicast group at a first time, and
   transmit, via the communication interface, a request to the service provider to join the second multicast group at a second time different from the first time.

5. The device of claim 1, wherein the logic is further configured to:
   assemble a programming guide using the received television programming information received over a plurality of transmission intervals.

6. The device of claim 1, wherein the second multicast group and the plurality of multicast groups comprise ten multicast groups associated with ten days of television programming information.

7. The device of claim 1, wherein the logic is further configured to:
   transmit an indication to another device located on a same local area network or in a same customer premises when the device is attempting to join at least one of the first multicast group or the second multicast group.

8. The device of claim 1, wherein the device comprises at least one of a set top box or a device including a cable or television card configured to receive television programming.

9. A method, comprising:
   encoding data for multicast transmission to a plurality of receiver devices, wherein the encoded data corresponds to television programming guide information and an index associated with the television programming guide information;
   dividing the encoded data for transmission over multiple channels;
   receiving a request, via a unicast transmission from a first one of the plurality of receiver devices, for multicast address information;
   forwarding the multicast address information to the first receiver device; and multicasting the encoded data over the multiple channels to the plurality of receiver devices,
wherein the dividing the encoded data comprises dividing the encoded data over at least two channels, wherein a first one of the at least two channels is used to transmit the index and a second one of the at least two channels is used to transmit a day of television programming guide information.

10. The method of claim 9, wherein the multicasting the encoded data comprises:
multicasting each day of a plurality of days of television programming guide information over a different channel.

11. The method of claim 9, further comprising:
providing, to the first receiver device, configuration information in response to the request, the configuration information including region mapping information identifying a plurality of regions and corresponding multicast addresses.

12. The method of claim 9, wherein the method is implemented as computer-executable instructions embodied on a computer-readable memory device.

13. A system, comprising
at least a first device associated with a service provider, the at least first device comprising:
first logic configured to:
encode data for multicast transmission, wherein the encoded data corresponds to television program information and an index associated with the television program information, and
divide the encoded data into portions for transmission over a plurality of channels, wherein the dividing the encoded data comprises dividing the encoded data over at least two channels, wherein a first one of the at least two channels is used to transmit the index and a second one of the at least two channels is used to transmit a day of television programming information; and
a first communication interface configured to:
multicast the encoded data over the multiple channels; and
a second device associated with a customer, the second device comprising:
a second communication interface configured to:
receive the encoded data multicast over the plurality of channels; and
second logic configured to:
decode the encoded data,
assemble a programming guide based on the decoded data, wherein the programming guide includes television program information and an index associated with the television program information, and
output the programming guide to an output device for display.

14. The system of claim 13, wherein the second logic is further configured to:
transmit a request, via the second communication interface, to the service provider, for address information associated with receiving at least one portion of the programming guide, and
wherein the first logic is configured to transmit, via the first communication interface, the address information to the second device via a unicast transmission.

15. The system of claim 13, wherein the second logic is further configured to:
identify a plurality of multicast addresses associated with a plurality of days of television program information,
join, via the second communication interface, a plurality of multicast groups associated with the plurality of multicast addresses, and
receive, via the second communication interface, television programming information for the plurality of days via the plurality of multicast groups.

16. The system of claim 13, wherein the second logic is further configured to:
transmit, via the second communication interface, an indication to an other device located on a same local area network or in a same customer premises as the second device to alert the other device that the second device is attempting to join a multicast group associated with the programming guide.

17. The system of claim 13, wherein the second device comprises at least one of a set top box or a processing device that includes a cable or television card configured to receive television programming.

18. The system of claim 13, wherein the second logic is further configured to:
identify a plurality of multicast addresses associated with a plurality of days of television program information based on a region in which the second device is located, and
join, via the second communication interface, a plurality of multicast groups associated with the plurality of multicast addresses.

* * * * *